United States Patent [19]
Forsyth et al.

[11] 3,902,000
[45] Aug. 26, 1975

[54] TERMINATION FOR SUPERCONDUCTING POWER TRANSMISSION SYSTEMS

[75] Inventors: Eric B. Forsyth; Jack E. Jensen, both of Brookhaven, N.Y.

[73] Assignee: The United States of America as represented by the United States Energy Research and Development Administration, Washington, D.C.

[22] Filed: Nov. 12, 1974

[21] Appl. No.: 523,182

[52] U.S. Cl. .......... 174/15 BH; 174/DIG. 6; 174/19; 174/73 R
[51] Int. Cl.² ........................................ H02G 15/22
[58] Field of Search ...... 174/15 BH, 16 BH, 12 BH, 174/14 BH, 15 C, 15 R, DIG. 6, 19, 20, 73 R, 11 BH, 11 R

[56] References Cited
UNITED STATES PATENTS

| | | | |
|---|---|---|---|
| 3,440,326 | 4/1969 | Lair | 174/15 BH X |
| 3,539,702 | 11/1970 | Edwards et al. | 174/15 BH X |
| 3,720,777 | 3/1973 | Sampson et al. | 174/15 C |
| 3,728,463 | 4/1973 | Kullman | 174/19 X |
| 3,737,824 | 6/1973 | Coles | 174/DIG. 6 |
| 3,764,726 | 10/1973 | Kohler et al. | 174/DIG. 6 |
| 3,801,723 | 4/1974 | Kubo et al. | 174/DIG. 6 |
| 3,835,239 | 9/1974 | Schmidt et al. | 174/DIG. 6 |
| 3,849,589 | 11/1974 | Schmidt et al. | 174/DIG. 6 |
| 3,865,968 | 2/1975 | Heumann | 174/DIG. 6 |

Primary Examiner—Arthur T. Grimley
Attorney, Agent, or Firm—Dean E. Carlson; Leonard Belkin; Cornell D. Cornish

[57] ABSTRACT

Cold, electrical gradient, terminal section for a superconductor cable for alternating current power transmission for making an electrical connection between room-temperature components and a cable that is operating in the superconducting mode and is carrying electrical power. In one embodiment, this invention has a cold electrical gradient section in series with a separate thermal gradient section, the former having an electrical stress cone of increasing diameter filled with a flowing, pressurized, gaseous, He, cryogenic coolant, which acts as an electrical insulator and longitudinally separates spaced-apart, solid, oppositively tapered, electrical insulators axially arranged between co-axial, cylindrical superconductors forming composite structures in a containment for the cryogenic coolant for providing control of the electrical field intensity and current density in a cold electrical gradient terminal section that is in series with a thermal gradient section having a room temperature portion containing high pressure seals. The cable may be rigid or flexible.

10 Claims, 6 Drawing Figures

Fig. 2

UPPER END OF TERMINAL
(GAS REMOVAL AT UPPER END)

TERMINATION FOR SUPERCONDUCTING POWER TRANSMISSION SYSTEMS

BACKGROUND OF THE INVENTION

This invention was made in the course of, or under a contract with the United States Atomic Energy Commission.

In the field of superconducting transmission lines, the cable and cable containment envelope terminate at the cold end of the pothead termination, so that electrical and thermal gradient sections are required.

One system for terminating a superconducting transmission line is the system shown in FIG. 3–4 on page 127, in "Superconducting Cable System", by H. M. Long et al., EEI Project RP 78-7, Final Report, EEI Underground Transmission R&D Program Steering Committee, Oct. 31, 1969, where the thermal and electrical gradient sections are in series. However, the cable disclosed has rigid thermal and electrical gradient sections that have been difficult to construct, bend and assemble by conventional pulling techniques. Also, the electrically graded section has been above the thermally graded section, such that the former has been at room temperature. This has precluded the use of a helium dielectric in the electrical gradient section, since the breakdown properties of helium deteriorate as the temperature increases and the density is reduced. It has also been advantageous to provide room temperature high pressure seals in a terminal pothead having a thermal gradient section formed with co-axial capacitive grading cylinders whose ends are graduated according to a log log radius function times a constant. Still further it has been advantageous to remove cooling gas at the end of an L-shaped termination. Finally, a terminal for flexible and inflexible cable is desired.

SUMMARY OF THE INVENTION

This invention overcomes the problems known heretofore and provides the desired cold electrical gradient terminal means for superconducting cables for alternating current power transmission by providing longitudinally in an annulus between an inner high tension superconductor and an outer electrically neutral coaxial superconductor, an electrical stress cone filled with a continuously flowing, pressurized, gaseous, cryogenic coolant that is at a cold substantially uniform temperature sufficient to be an effective gaseous electrical insulator, while still maintaining the superconductor below its critical temperature $T_c$. The stress cone is interposed between longitudinally spaced-apart, first and second, insulator means of different thicknesses and outside diameters on either side of the stress cone so as to be separated by the stress cone in the vicinity of a gas, gas filled solid, or solid insulator containing the large electrical gradient that appears between the inner high tension superconductor and the outer superconductor. The first insulator comprises either a gas or a flexible lapped insulator that is tapered and permeable to the flow of coolant, while the second insulator is solid and has portions at a higher temperature than the first insulator. The first insulator is gas or has small openings, hereinafter referred to as foraminae, for transporting and circulating cryogenic coolant at high pressure and low temperature longitudinally along and radially through first and second superconductors that are permeable to the coolant in a containment for the cryogenic coolant so as to provide an improved superconductor cable that can be pulled and connected between L-shaped terminals having room temperature seals. The second insulator has a flexible insulator matrix, and imbedded therein independent capacitive grading cylinders whose ends are graduated according to a log log radius function times a constant. Thus, the terminal can be used for flexible or inflexible cable.

In one embodiment of the cold electrical gradient terminal means of this invention, a specific gas filled stress cone is provided in between flexible insulators tapering in opposite directions so as to decrease and increase in outside diameters in opposite directions respectively in an annulus between cylindrical, co-axial low-loss superconductors at different potentials for alternating current power transmission. To this end, this invention provides means defining a containment for a cryogenic coolant, such as He or $H_2$ under 10–20 atmospheres at about $\frac{1}{2}T_c$ or less, and inside the containment a plurality of cylindrical, co-axial, superconducting means arranged in a flux-jump stabilized, composite structure so that each of the superconducting means is separated from neighboring superconducting means by electrical insulation means, and the superconducting means are electrically coupled so as to provide at least two discrete balanced electrically conducting magnetic field producing pathways separated from each other. This makes possible means outside the containment for electrically coupling the ends of each of the pathways to different potentials for circulating opposing currents in the pathways so as to effect different potentials between the superconductors and/or a substantial magnetic field counterbalance between the pathways while the pathways are immersed in the cryogenic coolant. More particularly, this invention provides in an annulus between two cylindrical co-axial, stabilized superconductors, a cold, electrical gradient, cryogenic fluid stress cone means of increasing diameter, and on either side of the stress cone longitudinally spaced apart, annular, first and second, foraminous and solid electrical insulator means having different thicknesses and temperatures, the insulators being interposed axially between flexible, co-axial, cylindrical superconducting means, which form the annulus. In the stress cone, an annular, cone-shaped, cryogenic, coolant flow forms a uniform pressure, gas-filled, insulator portion that increases in diameter longitudinally along the terminal to define a cryogenic, transition, terminal, electrical stress cone at a substantially uniform low first temperature (e.g. at ~ $\frac{1}{2} T_c$ or below) in the longitudinally extending annular space between the first and second flexible insulator means. The cryogenic coolant forms an increasing diameter, cold, circulating, gaseous, insulator, terminal, electrical gradient means in the annulus by continuously communicating with the stress cone from the foraminae of the first insulator under pressure at a substantially uniform temperature below the critical temperature of the superconducting means in the longitudinally space between the first and second electrical insulator means. Thus, the cold, electrical gradient terminal means forms a gaseous insulator that longitudinally separates the first and second insulators and forms is the stress cone around the inner superconducting means an annular, gaseous, flowing dielectric of increasing diameter at a first substantially uniform low temperature and a first high density so as to provide in the stress cone first electrical breakdown properties, while there is provided means adjacent the second insulator for expanding the gaseous insulator to a second lower density so as to circulate the cryogenic coolant across a series arranged thermal gradient section along the second insulator at a different location from the stress cone and at a higher temperature therefrom where the gaseous insulator has second reduced electrical breakdown characteristics. By circulating the coolant through outer concentric annuli and in a channel at the center of the tube inside the inner superconducting means, as described in more detail hereinafter, the desired cooling of the terminal and cable are achieved in accordance with this invention in a serpentine labrynth, and the desired electrical and temperature gradients are achieved in series at different locations. Also, with the proper selection of elements and their arrangement, as described in more detail hereinafter, room temperature seals are provided, and the desired flexible superconductor and L-shaped terminals are achieved. Torque balancing is additionally achieved by oppositely wound insulating tape between the superconductors, while the method of this invention achieves control of the coolant in major and minor flow paths.

It it thus an object of this invention to provide an improved cable and termination system for a superconducting transmission line by providing a cold gas filled stress cone shaped electrical gradient terminal section.

The above and further novel features and objects of this invention will appear more fully from the following detailed description of two embodiment of this invention when read in connection with the accompaying drawings, and the novel features will be pointed out in the appended claims.

BRIEF DESCRIPTION OF THE DRAWINGS:

In the drawings, where like elements are reference alike:

FIG. 1 is a partial cross-section of a stabilized superconductor;

FIG. 1a is a partial isometric drawing of a superconducting transmission line cable embodying the stabilized superconductor of FIG. 1; FIG. 1b shows the layers of FIG. 1a.

FIG. 3 is a partial cross-section of the stress cone of this invention and the adjacent transmission line of FIG. 1a.

FIG. 4 is a partial cross-section of another embodiment of the terminal of FIG. 1a.

Figures 1, 1A, 1B:
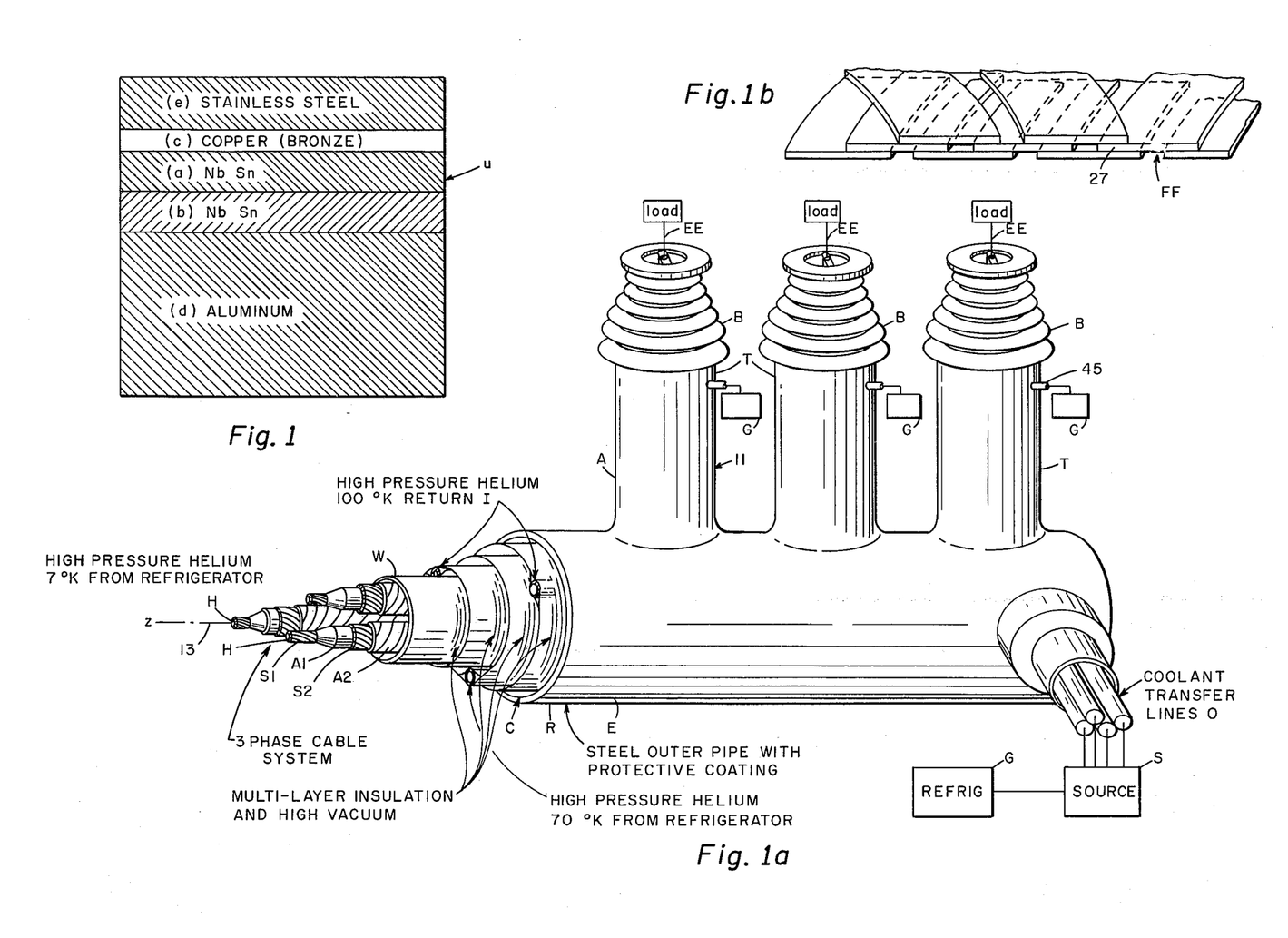

DETAILED DESCRIPTION OF THE PREFERRED EMBODIMENT:

Referring to FIG. 1 of U.S. Pat. No. 3,720,777, it is known that flux-jump stabilized, multilayer, composite-structure, flexible superconducting means can be assembled and pulled in a cryogenic containment to form a superconducting transmission line and cable, and the characteristics and mathematics of such containments, as well as the stabilized superconductors thereof, are well known in the art. One stabilized superconductor is shown herein in FIG. 1, which shows a partial cross-section through a circular cross-section cylindrical tube formed by helically wound superconducting ribbons $a$ and $b$, and normal resistance tapes $c$, $d$ and $e$ that are helically wound therewith to form one superconducting composite structure u. As described in the above-mentioned patent, the superconducting composite structures, hereinafter referred to as superconductors S1 or S2, are advantageously arranged in parallel in a containment for a cryogenic coolant that is circulated across the faces of the parallel superconductors in a serpentine path from a source and a refrigerator. Efficient, low-loss transmission is based on the fact that the containment insulates the coolant from the ambient so that the conductors are in their zero resistance state below their critical temperatures $T_c$, while the coolant also provides an electrical insulator between the parallel superconductors. Thus, adjacent superconductors are capable of having different potentials. In the cited U.S. Patent, parallel flat conductors are shown, but the principles involved apply equally to two cylindrical, co-axial tubes formed by two of the superconductors of FIG. 1. For example, two cylindrical, co-axial superconductors S1 and S2 can be cooled in a containment that is cooled by a cryogenic fluid that forms an insulator in the inner annulus A1 between the superconductors, as shown in FIG. 1a, where the elements, moving axially inwardly toward the cross-section centerline, are the vacuum, multi-layer, insulation, cooled shields forming the containment C; the outer annulus A2 for the coolant I; the outer foraminous composite superconductor S2; the inner annulus A1; the inner composite foraminous superconductor S1 and the central channel H. Also, terminals are required from the outside of the containment to the inside thereof to provide for electrically coupling the ends of each of the pathways, while the pathways are immersed in the cryogenic coolant.

The invention hereinafter described utilizes a cryogenic containment and flexible flux-jump stabilized, superconductor multi-layer composite structures of the type described and claimed in the above-identified patent in which the insulation in the inner annulus A1 increases in diameter and changes from foraminous gas filled, to gaseous, to solid filled, and in which the coolant communicates with and circulates through a gas filled stress cone for making the required connections for control of the electric field intensity and current density of the superconductors in the presence of substantial temperature and pressure gradients. Additionally, the wall thickness of the composite superconductors increases, and room temperature seals are provided. A mathematical treatment of the principles involved in this invention is given a Brookhaven National Laboratory Report entitled, "Power Transmission Project Technical Note PTP26."

In order to explain how the method and apparatus of this invention accomplish the function of providing a gas-filled stress cone 11 for terminally connecting co-axial, cylindrical, spaced-apart superconductors S1 and S2 from the inside to the outside of a cryogenic containment C for a cryogenic coolant I, reference is made to the partial three-dimensional illustration of the cable R of this invention in FIG. 1a. The cable and cryogenic cable containment envelope terminate at the cold end E of the pothead termination T. Thus, a splice or joint must be made between the conductors of the cable R of the terminal of this invention and the conductors in the termination device T. While FIG. 1a shows three cables R in a three phase system having three terminals T, for ease of explanation the last terminal T will be described, it being understood that the cooling tubes 0 can come out of the back of FIGS. 1a and 3, or along the axis of the cable R at right angles to their direction shown in FIG. 1a. In either case, the tubes 0 for the coolant come out through the steel case and vacuum insulation of the containment C. In general this insulation is provided by a conventional combination of vacuum spaces, radiation multi-layer insulation, and force-cooled shields, such as contemplated by the above-cited patent. The forminae FF in the superconductors S1 and S2 and solid insulator in anulus A1 are formed by helically overlaying the superconductor ribbons of FIG. 1 with oppositely wound insulating tape, as shown in FIG. 1b, so as to provide a balanced torque.

In general, the $z - z$ axis is horizontal and the vertical $y - y$ axis is normal thereto, and the center-line 13 of the cable curves to correspond to these axes. Thus, an L-shaped bend is employed.

The end of the cable corresponding to one leg of the "L" is naturally where the cryogenic coolant from a source S is removed in order to cool the section of the cable R adjacent to the termination T. Therefore, the joint J must be designed to allow this transfer. Coolant for the termination shown in FIG. 1a is circulated into the joint from the main horizontal portion of the cable R. Accordingly, the coolant moves generally from left to right out the coolant tubes 0, and also from the bottom of the "L" to the top thereof in accordance with this invention. Accordingly, the latter flow will be described hereinafter; for ease of explanation, the temperature gradient vs. distance of the latter flow being shown in FIG. 2, while the serpentine path of the axial and longitudinal flow of the coolant around spacer P and through superconductors S1 and S2, i.e., the foraminous superconductors themselves, is shown by the arrows AA in FIG. 3.

Figure 2:
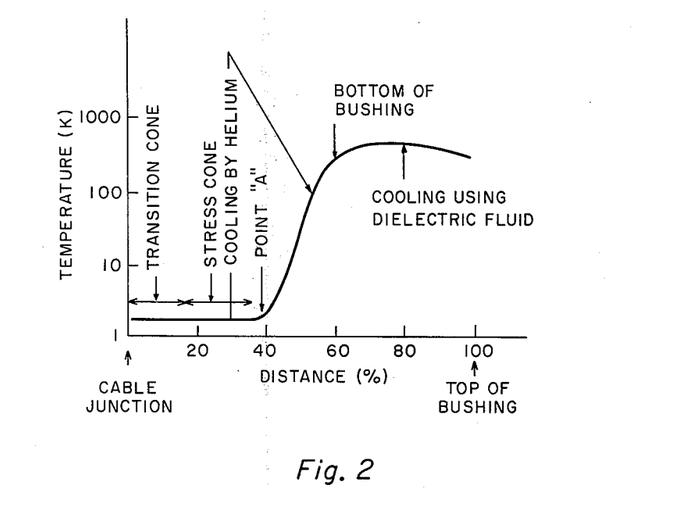
FIG. 2 is a graphic illustration of the relative distances and temperatures across the representative transmission line cable shown in FIG. 2.
Figure 3:
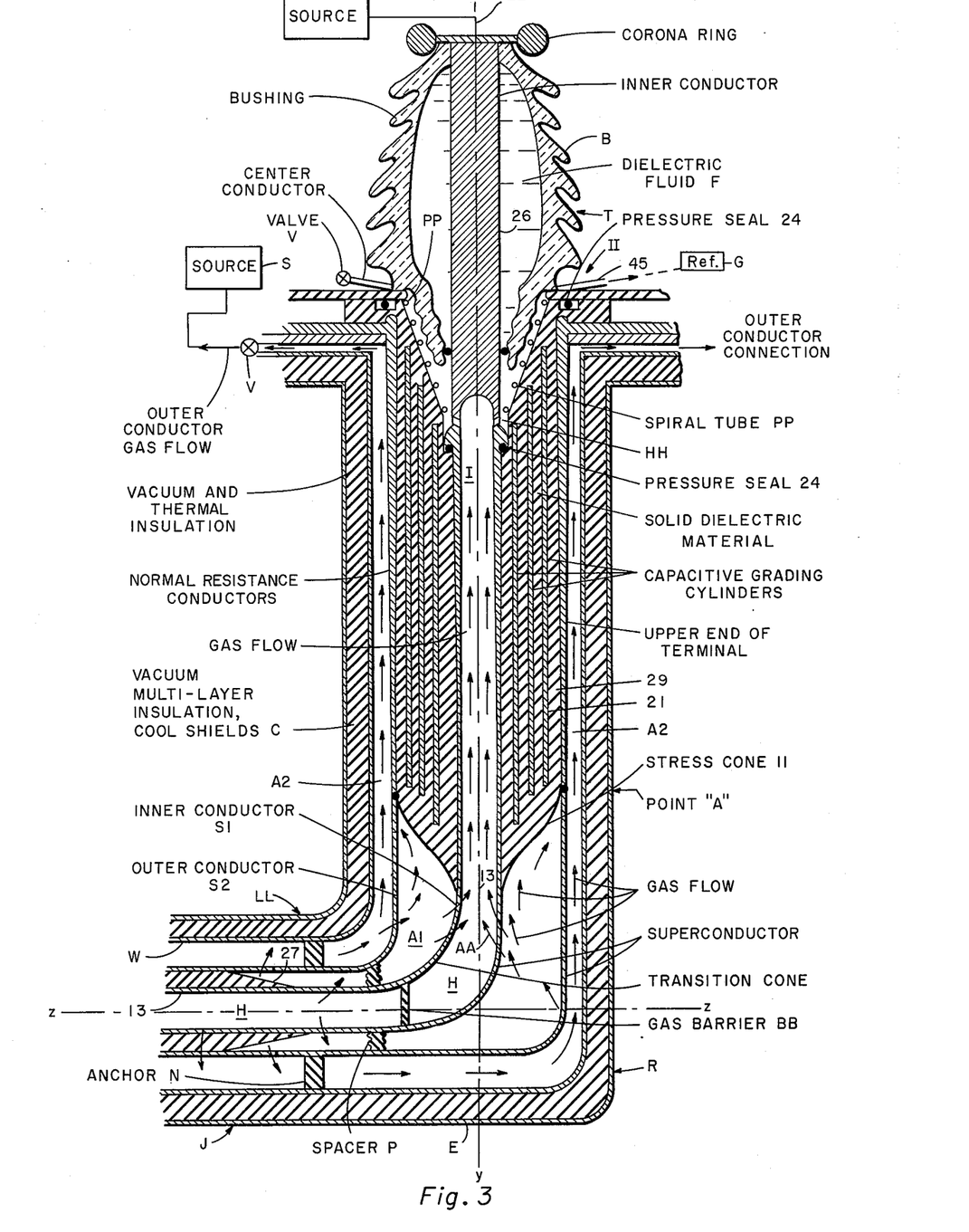

The region of the terminal T where the temperature is allowed to rise (and the cryogenic density can begin to decrease correspondingly), as illustrated in FIG. 2, is at a point A in FIG. 3 that is up to about 40% of the distance from the cable junction J to the top of the ceramic insulator bushing B shown in FIG. 3. In this region of the termination, the temperature is only allowed to rise slightly so that the superconductors S1 and S2 remain in their superconducting state all the way across the stress cone 11 of this invention. The cone itself is shaped to permit a reduction in the electric field intensity by a factor of from about 2 to 3. In this same region, capactive grading cylinders 21 are introduced in order to exclude the cryogenic coolant from the space between the conductors S1 and S2. When this is accomplished at point A, a rise in temperature can commence outwardly and upwardly therefrom in radial and longitudinal directions where the cryogenic coolant must be excluded due to poor electrical insulating and breakdown properties of the coolant as its temperature is raised.

At point A a transisition is made in the superconductor ribbons a and b of the superconductors S1 and S2 from their superconducting to their normal resistance states, as those terms are understood in the art, e.g., from the April 1972 and March 1967 Scientific American, as well as the above-cited patent. To this end, the normal resistance metal ribbons c, which are on top of the superconductor ribbons a and b, respectively, are made with a relatively thin wall, as shown in FIG. 3, because the skin-depth is small if a relatively pure normal resistance, metal tape c is used due to the relatively low temperature in the terminal T. This reduces the heat influx by thermal conduction in a longitudinal direction down the current lead EE of the cable R through the terminal T.

The wall thickness of the normal resistance tape c increases to match the increased skin-depth as the vertical, longitudinally extending temperature gradient along the superconductor S1 causes the temperature to rise. Typically the thickness required to minimize dissipation and prevent eddy currents in the vacuum vessel is between one and two skin-depth. Also, the temperature gradient between point A and the lower end of the room-temperature insulator bushing B is approximately the same for both the inner and outer superconductors S1 and S2. This is achieved by balancing the flow rate of the cooling gas I past each superconductor S1 and S2 and by manipulating the heat transfer coefficient using insulated fins, internal mesh/or gas baffle barriers BB.

Sealing the gas flow I past the inner superconductor S1 and where it is removed at the bottom of the room temperature insulator bushing B, is shown in FIG. 3. This is achieved by means of annular, high sealing pressure, neoprene, O-rings 24 operating at room temperature, as shown in FIG. 3. The coolant I for the outer superconductor S2 is not exposed to an electric field as it flows between the vacuum wall W of the containment C and the outside of the outer superconductor S2. Thus, the coolant I under electric stress is not exposed to a temperature higher than that at point A, and this can be kept at a low enough value to ensure satisfactory coolant gas breakdown characteristics.

The room temperature bushing B allows for the flowing gas coolant I cooling the inner superconductor S1 to be removed in one of two ways. In the preferred embodiment shown in FIG. 3, the bushing follows conventional practice by using conventional capacitive grading cylinders 21 and an internal dielectric fluid F such as oil or $SF_6$. It is not desirable to cool the inner conductor 26 in this region with the flowing gas coolant I through the center of the inner superconductor S1. Thus, the conductor 26 is cooled by the dielectric fluid F and the cryogenic coolant is removed in this embodiment through a plastic pipe PP that crosses the high voltage interface II and exits at the bottom of the bushing B. The pipe PP is an electrical insulator.

As shown in FIG. 3, the inner superconductor S1 in its normal resistance state in bushing B is insulated by solid insulator 29 and the vacuum and thermal insulation of the containment C to minimize heat flow to the coolant I, and pipe PP is insulated efficiently to return the coolant I to the ground-potential refrigerator G.

In one example, consider first the temperature of a pressurized cryogenic coolant as it circulates seriatum in serpentine fashion along the center line 13 of the cable R, and into, along, through and out-of the central channel H formed by the inner superconductor S1. For example, this path progresses from the main horizontal part of the cable, which may be buried in a trench (not shown), toward the top of the ceramic insulator bushing B, which is vertically disposed, as shown in FIG. 3. The coolant I first enters the L-shaped portion of the cable at junction J, which for ease of explanation is in the horizontal cable portion at the left hand side of the "L" bend, where the coolant is below 10°K to maintain the cable R below its critical temperature $T_c$. An anchor N holds the cable and terminal together at junction J, since this is where the terminal is connected to the cable by conventional means, such as welding. Meanwhile, the inner superconductor S1, which is adapted to operate at a high electrical potential difference relative to the outer superconductor S2, may be at ground potential or oppositely energized to S2. As the coolant progresses by entering the stress cone 11 (from left to right in FIG. 3) the coolant remains at the same substantially uniform temperature, which is below 10°K. Moreover, the coolant temperature (at a pressure that is between 10–20 atm.) remains at a substantially uniform or slightly increased temperature value until the coolant exits from the stress cone 11 at point A, which is about 40% of the distance traveled from the cable junction J toward the top of the bushing B, as shown in FIG. 3. Thus, it will be understood that the coolant I in the stress cone 11 is in a cold gaseous state under pressure. Also, the coolant I in the stress cone 11 separates longitudinally spaced apart first and second solid insulators 27 and 29 in the annular space A1 formed radially between the two co-axial cylindrical superconductors S1 and S2 so that the gaseous coolant has its highest electrical breakdown characteristics in the annulus formed in the stress cone. As shown in FIG. 3, the stress cone 11 is a longitudinal extension of annular space A1 between the superconductors S1 and S2 but with a diameter that increases so that the second insulator 29, which is also in annular space A1, is thicker than the first insulator 27 and also has a larger outside diameter.

The coolant I is expanded after passing the stress cone 11 to a second lower density and removed from point A for recirculation through a central channel H and the helical extractor tube 45, where the coolant expands at a distance downstream from the stress cone 11 to provide a temperature gradient from below the critical temperature $T_c$, which is 18°K for $Nb_3Sn$, to a higher temperature, such that the electrical breakdown characteristics of the gas coolant I are reduced to their lowest value at the top of the bushing B. To this end, suitable valves V are used.

In the embodiment shown in FIG. 3, the first insulator is a flexible foraminous electrical insulator containing coolant I in foraminae, which are defined herein as openings containing cryogenic coolant for the circulation thereof longitudinally along the annular space A1 between the inner and outer superconductors S1 and S2, and also for axial circulation of the coolant from S2, the center channel H to an outer annulus A2 around the outer superconductor S2. Additionally, the coolant passes through the superconductors S1 and S2 as well as insulator 27, and the second insulator 29 is a flexible, solid, electrical insulator in annular space A1 between the superconductors S1 and S2, but, above point A it is above the critical temperature $T_c$. Thus, this invention provides longitudinally spaced-apart, annular, first and second flexible foraminous and flexible solid electrical insulators having different thicknesses and temperatures separated by a gas filled stress cone, all of which are interposed between superconducting means that are also flexible and form an annulus that increases in diameter longitudinally. The composite structure also defines an L-shaped transition, terminal, electrical stress cone at a low, substantially uniform, cryogenic temperature in the longitudinally extending space between the first and second insulators and axially between the first and second superconductors for efficiently controlling the electric field intensity and current density in the presence of the required substantial temperature and pressure gradients. This has the advantage that, the cold end of the termination contains the inner superconductor S1 in its superconducting state to prevent temperature rise in the region of the joint and stress cone. By increasing the outside diameter of this conductor the electric stress is manipulated to reduce the electric field across the gaseous insulator I. Also, the temperature rise occurs in a region where the electric field across the coolant I is zero, and the termination is cooled by tapping off a portion of the center gas flow for compression and recirculation in the cable.

Advantageously, the cryogenic coolant I is gaseous helium, as understood from FIG. 4 of U.S. Pat. No. 3,720,777. To this end, conventional refrigerators supply the coolant I under pressure so that the coolant having a high density and corresponding high electrical breakdown characteristics, can be contained and circulated in a serpentine fashion in around and through a foraminous insulator 27 in relatively narrow annular space A1 between the inner and outer superconductors S1 and S2, while the composite structures S1 and S2 are contained in an insulated evacuated box referred to herein as a containment C, like that described and shown in FIG. 4 of the above-cited patent, to prevent large heat flow from the ambient, which may be a room temperature or above, into cable R or its composite structure. As described above, with reference to the embodiment of FIG. 3, superconductors S1 and S2 form inner and outer co-axial current and voltage pathways separated by an annulus that contains foraminous and solid insulators separated by a gas filled, doughnut-shaped stress cone of increasing minor radius having an L-shape in cross-section. As shown in FIG. 3 a ring-shaped spacer P separates the bottom (horizontal section) of the stress cone from the adjacent portion of the forminous insulator, while disc-shaped gas barrier baffles BB block the central channel H. Also, the spacer and gas barrier force the circulating, cold, pressurized gas in the foraminae of the solid insulator 27 to flow from the central channel H through the foraminous superconductors.

In the operation of one example of this invention the outer and inner composite superconductors S1 and S2 each comprise tubes consisting of two equally thick $Nb_3Sn$ ribbons made by the diffusion process of U.S. Application Ser. No. 270,882, filed on July 12, 1972, although the process of U.S. Pat. No. 3,731,374 may alternately be employed. To this end, an outer normal resistance tape $c$ is placed next to a Nb ribbon $a$ and a tin coating on the tape $c$ is diffused through the tape $c$ under high temperature until the tape a is all converted to $Nb_3Sn$, although a thin outer $Nb_3Sn$ layer may alternately be used since it has advantageous bending properties as disclosed in the above cited application. A like superconducting ribbon $b$, with the copper removed therefrom is placed next to the ribbon $a$ and the copper tape and the two $Nb_3Sn$ ribbons $a$ and $b$ are interposed between a stainless steel tape $d$ and an aluminium tape $e$ to form the composite structures of superconductors S1 and S2. To this end, the aluminum tape is wound in a solenoid having openings or helical foraminae between the windings thereof for circulation of coolant I radially therethrough, as shown in FIG. 3. This forms the inner central channel H for the longitudinal flow of the coolant I along the central axis of the cable 15. Then first and second Nb₃Sn ribbons are helically wound in the same directions around the outside of the aluminum support tube formed by the windings of the aluminum tape so that the copper sheathed ribbon is on top of the aluminum and both Nb₃Sn ribbons form foraminae for the radial circulation of coolant I therethrough. The stainless steel tape is helically wound on top of the copper sheath e so as to form foraminae for the passage of coolant I radially therethrough. This forms the composite structure of the inner superconductor S1.

The composite structure of the outer superconductor S2 is formed in like manner, except that the helically wound ribbons a and b and the helical windings of the tapes c, d, and e have a larger diameter than in the inner conductor. To this end, foraminous insulator 27 is a tape helically wound on the outside of the inner composite superconductor S1 before the outer foraminous composite superconductor S2 is wound thereon to form the inner annulus A1. Likewise, the annulus forms a space after the gas barrier around an L-bend, and the solid insulator 29 is arranged without foraminae by packing solid insulation along the cylinders 21 before the outer composite superconductor is wound on the outside thereof as the terminal is progressively formed along the center-line thereof by the described helical windings. Suitable insulating tapes for insulator 27, comprise conventional organic insulating tape, such as polycarbonate tape, filled polyolefin tape, polytetrafluoroethylene tape (glass filled or unfilled) or polyethylenetetrephthalate tape, but any foraminous flexible insulation could alternately be employed.

In one example of the superconducting transmission line and pothead of this invention single phase or multiphase cables are required in a cryogenic containment having terminals that provide a method of making electrical connections to the super-conducting cable from the outside to the inside of the containment and to the superconducting cable at one end, and to a room temperature circuit at the other end. This involves control of the electric field intensity and current density in the presence of substantial temperature and pressure gradients as describe above, so that such would be known as a pothead in conventional cable systems, although the complication of significant temperature gradient is absent in conventional systems. The pothead termination of this invention provides in one cryogenic containment envelope at least two single-phase leads at different potentials, and by simply adding an additional number of leads, three-phase or any other multiple-phase circuits may be supplied. The isolated phase conductors forming a superconducting cable may be extended through the termination, and in a three-phase system the outer conductors are normally connected together at the room-temperature ends of three potheads. Under balanced conditions, the currents in each conductor cancels out. However, the possibility exists of connecting the outer conductors to a common sheath at the low temperature end so that the sheath carries zero-sequence current, (i.e. is neutral), and some reduction is afforded in the refrigeration load of the termination.

Figure 4:
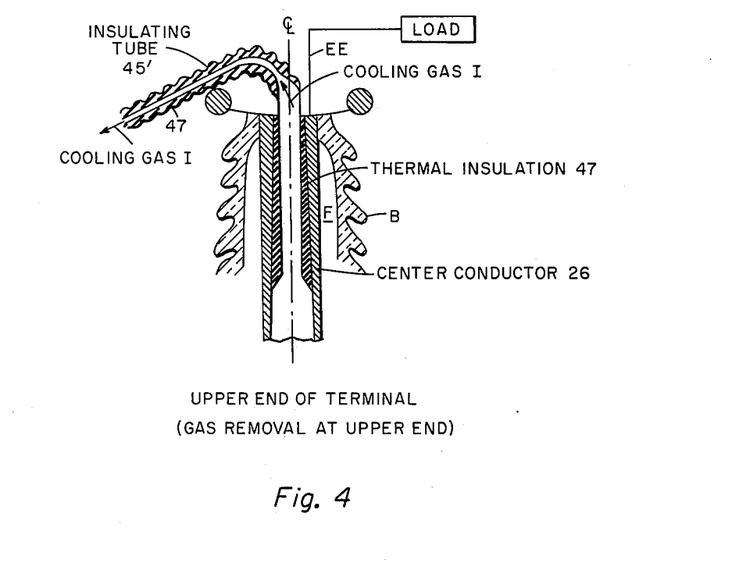

The coolant I flows from suitable refrigerators and pumps connected to a suitable source, such as a liquid helium source, through the central channel H so that the coolant works its way longitudinally along the central axis of the cable R and radially and longitudinally therefrom in a serpentine flow that communicates with the inner annulus A1, the two superconductors S1 and S2, and the outer annulus A2. Likewise, the coolant flow works its way therefrom around the described spacers and barriers forming a labrynth LL and into the stress cone 11, while the flow therefrom communicates both to the outer and inner annuli A1 and A2 and to the exit cooling duct for the bushing B. To this end, the central superconductor S1 has an axial hole HH that communicates with the exit tube of FIG. 3 that spirals around the bushing, or a longitudinal hole at the top of the bushing of FIG. 4 for expansion or cooling, and recirculation to the center of the cable R.

As understood in the art, the central and outer conductors are connected at room temperature by conventional means to suitable electrical energy sources and/or potentials, comprising, for example 60Hz sources and ground potentials for the transfer of electrical energy and/or electrical signals from one end of the cable R to the other end thereof. To this end, it is advantageous to use like terminals at the opposite ends of the cable. For ease of explanation, only one cable end is shown, since the opposite ends are substantially identical.

While the above has described superconductors formed from tapes and ribbons, it will be understood that the commercial superconductors described in U.S Pat. No. 3,720,777 can be used, and/or alternately braided stabilized superconductors and normal resistance ribbons can likewise be interleaved to form foraminous composite superconductors, as described in the above-cited U.S. Pat. No. 3,720,777, since all these elements are flexible, as is the described cable. Alternately, a rigid superconducting cable can be used.

Likewise it is understood that a wide range of normal resistance metals and heat sink conductors may be used for stabilizing the superconductors. For example, these comprise, copper, silver, lead, cadmium, indium, aluminum, thallium, tin, titanium, niobium, vanadium, hafnium, magnesium, iron, nickel, bismuth, cobalt, zirconium, berylium, and alloys, such as nichrome and stainless steel and/or normal resistance or resistive superconductors above their critical temperatures $T_c$, as understood from U.S. Pat. No. 3,720,777.

Likewise, shorting means comprising metallic members that are interleaved with the other composite members and/or thermally setting and/or in-place diffusing elements may be employed.

Additionally, it is understood that various superconductors and/or other well known coolants than helium can be used, as is understood in the art.

Still further, it is understood that three of the desired cables can each have balanced operation, and accordingly the superconductors can have opposite current flow therein. For example, these opposite currents can be balanced (180° out of phase) as described in U.S. Pat. No. 3,720,777.

THE FOLLOWING ARE SPECIFIC EXAMPLES OF THIS INVENTION

EXAMPLE I

An inner composite superconductor ribbon, which is flexible, is formed into a tubular central channel that increases in wall thickness toward a terminal rod extension in an insulating bushing, and is helically wound and assembled on an aluminum support ribbon to provide a terminal hole and helical openings between the windings. Then suitable spacers, baffles and anchors are assembled, and capacitive grading cylinders having an insulating matrix are added in spaced apart relation on the inner superconductor.

Ten helically wound layers of plastic insulating tape are wound on top of the inner superconductor, and ten helically wound layers of plastic insulating tape are oppositely wound on the first ten layers of tape, all twenty layers of the tape having openings for the passage of helium therethrough. The opposite winding produces a balanced torque during the cooling down period from room temperature to a temperature below the critical temperature of the superconductor. Further insulation is added in the same manner to achieve the desired total thickness of insulation. The many layers of tape are wound to provide a decreasing diameter inside an anchor adjacent a spacer and a baffle and adjacent the stress cone and oppositely tapered to the stress cone, which is provided by an insulator formed from capacitive grading cylinders in an insulating matrix.

The outer composite superconductor ribbon is helically wound on the many layers of tape insulation to form an assembled cable having a superconducting section that includes a stress cone in series with a thermal gradient section and two concentric outer annuli. To this end, the assembled cable is pulled through a conventional vacuum insulation and is bent around an L-shaped terminal end so that the stress cone space tapers oppositely in cross-section from spaced points adjacent the inner composite superconductor. These outer composite superconductor also forms a tube that increases in wall thickness at the end thereof in the graded capacitive cylinders toward the room temperature insulating bushing, and is co-axial with the inner superconductor, which also tapers in a like manner.

The room temperature insulating bushing is assembled around the inner superconductor rod extension so that a plastic, helically wound, insulating tube connects along the outside of the bushing with the hole in the end of the inner superconductor adjacent the rod extension thereof. The helically wound insulating tube is interposed between like corresponding tapers on the lower end of the insulating bushing and the upper end of the capacitive grading cylinders, the latter being sealed on their inside diameter against leakage from the terminal hole, along the inner super-conductor, and along the outside diameter of the bushing by suitable neoprene, room temperature o-ring shaped seals and forming a thermal gradient section in series with the electrical gradient section provided by the stress cone, which merges the annuli A1 and A2.

The room temperature helically wound plastic tube provides a long, insulating, helical path escape route in the thermal gradient section from the central tube formed by the inner superconductor, while the outer concentric annuli having parallel gas flow therein communicate with the central channel through the stress cone along the outside of the outer superconductor. The two outer concentric annuli contain the major amount of the total flow at a first rate, and the central channel contains the minor amount of the total flow in parallel with the outer annuli at a second rate. To this end, the major amount of the cryogenic cooling fluid is removed through the coolant tubes 0, and the remaining amount is circulated in and through the stress cone from the outer annulus and the central channel. The amount of the cooling fluid circulated in and through the stress cone is controlled by slectively releasing the cooling fluid from the central channel and the outer annulus at the top of the terminal T for maintaining a balance between the two aforesaid rates, a first temperature and pressure in the superconducting and stress cone sections, first high peak electrical breakdown characteristics in the superconducting and stress cone sections, and second lower electrical breakdown characteristics in the thermal gradient section provided along the capacitive grading cylinders.

EXAMPLE II

The steps of Example I are repeated using a flexible or a rigid vacuum-insulated containment that is assembled around the composite inner and outer superconductors, and the whole assembly placed in a conduit in a trench by conventional means.

EXAMPLE III

The steps of Examples I and II are repeated using plastic thermally and electrically insulated anchors, spacers and gas barriers, as shown in FIG. 3. Also, overlapping layers of plastic insulating tape that are permeable to helium are used in between the $Nb_3Sn$ composite superconductors of FIG. 1 that are helically wound to be permeable to He, and liquid He is circulated therethrough at between 10 and 20 atmospheres to cool the superconductors to a temperature of 10°K or below. To this end, the He exhaust from the cable assembly is controlled by selectively opening and closing valves V in the helical plastic exhaust and the outer annulus around the outer composite superconductor winding and the inside of the vacuum-insulated containment. Thes valving controls the helium flow so that the outer annuli contain the major amount of the flow at a first rate, the inner central channel contains the minor amount of flow at a second rate, and the two flows and rates are balanced across the stress cone.

The capacitive grading cylinders are conventional, and are made from conductive metal cylinders, such as aluminum in a matrix of powdered compressed $Al_2O_3$ and epoxy. The bottom end of the cylinders are collectively tapered across the upper end of the stress cone according to the formula $Y = C - (K \log \log X)$ where $K = 0.73156045$, $C = 0.97880167$, $X =$ the distance along the axis of the stress cone, and $Y =$ the radius of the stress cone normal to the X axis. Typical parameters are ennumerated in TABLE I.

EXAMPLE IV

The steps of Examples I - III are repeated using the containment, cryogenic fluid source and refrigerator of U.S. Pat. No. 3,720,777, and the superconductor of U.S. Pat. No. 3,817,746 and/or other high temperature superconductors, such as organic superconductors. A suitable liquid cryogenic cooling fluid is used, such as helium or hydrogen, to cool the superconductor to a temperature ~ ½ its critical temperature $T_c$, which is the superconducting transition temperature.

EXAMPLE V

The steps of Examples I - IV are repeated, using the containment and electrical sources of U.S. Pat. No. 3,720,777.

EXAMPLE VI

The steps of Example V are repeated using opposite, sine wave, 60Hz, 180° out of phase current sources that balance the currents in the inner and outer composite superconductors so as to cancel the magnetic fields produced thereby, or to provide neutrality.

EXAMPLE VIII

The steps of Examples I – VII are repeated using three separate cables for three-phase service, each having an inner rigid or flexible superconductor and an outer like superconductor. The three phase conductors are 120° in phase separation, and six conductors in three pairs each have opposite, adjacent, balanced, ac, 180° out of phase currents in the pairs.

TABLE I

| X | Y-DIA |
|---|---|
| 0.0 | .500 |
| 0.5 | .518 |
| 1.0 | .538 |
| 1.5 | .558 |
| 2.0 | .579 |
| 2.5 | .602 |
| 3.0 | .626 |
| 3.5 | .651 |
| 4.0 | .678 |
| 4.5 | .707 |
| 5.0 | .737 |
| 5.5 | .770 |
| 6.0 | .806 |
| 6.5 | .844 |
| 7.0 | .886 |
| 7.5 | .933 |
| 8.0 | .984 |
| 8.5 | 1.040 |
| 9.0 | 1.104 |
| 9.5 | 1.177 |
| 10.0 | 1.261 |
| 10.5 | 1.360 |
| 11.0 | 1.480 |
| 11.5 | 1.628 |
| 12.0 | 1.800 |

What is claimed is:

1. Cold, electrical gradient, terminal apparatus for use with a source of cryogenic cooling fluid under pressure in a gas pressure insulated, superconducting transmission line having electrical and thermal gradient sections in series comprising:
    a. first, stabilized, cylindrical superconducting means;
    b. second, stabilized, cylindrical superconducting means that is co-axial with the first superconducting means and forms an annulus of increasing diameter therebetween; and
    c. first, pressurized, terminal, thermal gradient, electrical insulating means in said annulus forming a tapered, terminal, electrical gradient, stress cone that extends longitudinally in the annulus between the first and second superconducting means having
    d. flowing cryogenic cooling fluid under pressure in the annulus between the first and second superconducting means along the electrical gradient stress cone for providing a terminal cold electrical insulator between the first and second superconducting means;
    e. the thermal gradient electrical insulation means having outlet means for the cryogenic cooling fluid for circulating the same through the annulus and along the stress cone at a substantially constant pressure and at a temperature below the critical temperature of the first and second superconducting means so that the stress cone provides a cold electrical gradient terminal in series with the thermal gradient electrical insulation means.

2. The apparatus of claim 1 in which the first and second, flexible, cylindrical superconducting means are flexible, helicallywound, flux-jump stabilized, composite superconductors forming spaces between the windings for receiving and transporting the cryogenic cooling fluid therethrough while the superconducting means receive and transmit opposite adjacent, balanced ac currents therein.

3. The apparatus of claim 2 having a containment for immersing the first and second flexible, cylindrical, superconducting means in the cryogenic cooling fluid.

4. The apparatus of claim 3 having a helically wound, lapped, flexible, insulating tape that is permeable to the cryogenic cooling fluid and extends longitudinally in the annulus between the superconducting means to a point adjacent the first terminal, thermal gradient, electrical insulating means so as to form a space for communicating the cryogenic cooling fluid with the tapered, terminal, electrical gradient, stress cone therebetween.

5. The apparatus of claim 1 in which the co-axial superconducting means are bent to form an L-shaped annulus therebetween having labrynth means therein for communicating the cryogenic cooling fluid to the annulus and circulating the same therein in a serpentine-shaped flow pattern.

6. The apparatus of claim 4 in which the first superconducting means forms a tube along an axis that extends longitudinally through the tapered, terminal, electrical gradient, stress cone for transporting cryogenic coolant longitudinally along and radially through the first and second superconducting means and the lapped, flexible insulating tape at 10–20 atmospheres.

7. The apparatus of claim 6 in which the superconducting means, comprise at least one $Nb_3Sn$ superconductor ribbon forming a composite interleaved with tapes of stainless steel, copper, aluminum, and normal resistance insulating tapes that are lapped in opposite directions for producing a balanced torque effect.

8. The apparatus of claim 7 in which the first, flexible, terminal, thermal gradient, electrical insulating means, comprises an electrical insulating matrix having imbeded therein co-axial capacitive grading cylinders forming ends that are graduated according to a log log radius function.

9. The method of terminating a superconducting transmission line having co-axial, cylindrical, inner and outer high and low tension, gas pressure insulated superconductors forming an annular space therebetween and having electrical and thermal gradient sections in series, comprising the steps of:
    a. circulating in stages a cryogenic cooling fluid under pressure along the transmission line in a superconducting section in the annulus between both superconductors;
    b. releasing a portion of pressure of the cooling fluid in a thermal gradient section; and
    c. electrically insulating the superconductors with the cryogenic fluid under pressure in a portion of the annulus forming a stress cone section of increasing diameter at a temperature below the critical temperature $T_c$ of the super-conductors so as to form a cold electrical gradient section in series with the thermal gradient section and interposed longitudinally between the superconducting and thermal gradient sections of the transmission line.

10. The method of claim 9 in which a major amount of the cryogenic cooling fluid is circulated at a first rate in two outer concentric annuli, a minor amount of the cooling fluid is circulated in an inner central channel at a second rate, the annuli and channel communicate the fluid through a stress cone, and the fluid is released selectively from the outer annulus and from inside the central channel for maintaining a balance between the aforementioned rates, a first temperature and pressure in the superconducting and stress cone sections, first electrical breakdown characteristics in the superconducting and stress cone sections, and second lower electrical breakdown characteristics in the thermal gradient section.

* * * * *